United States Patent
Brown et al.

(10) Patent No.: US 7,254,571 B2
(45) Date of Patent: Aug. 7, 2007

(54) SYSTEM AND METHOD FOR GENERATING AND RETRIEVING DIFFERENT DOCUMENT LAYOUTS FROM A GIVEN CONTENT

(75) Inventors: Gregory T. Brown, Rockmart, GA (US); Thomas A. Cofino, Rye, NY (US); Yurdaer Nezihi Doganata, Chestnut Ridge, NY (US); Youssef Drissi, Ossining, NY (US); Tong-Haing Fin, Harrison, NY (US); Moon Ju Kim, Wappingers Falls, NY (US); Lev Kozakov, Stamford, CT (US); John Williams Miller, Duluth, GA (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 10/159,373

(22) Filed: Jun. 3, 2002

(65) Prior Publication Data

US 2003/0225747 A1    Dec. 4, 2003

(51) Int. Cl.
*G06F 17/30* (2006.01)
*G06F 15/16* (2006.01)
(52) U.S. Cl. .................. 707/3; 707/1; 707/2; 707/100; 715/515
(58) Field of Classification Search ............... 707/102, 707/100, 6, 2, 1, 3; 715/515
See application file for complete search history.

(56) References Cited

U.S. PATENT DOCUMENTS

| | | | |
|---|---|---|---|
| 6,065,026 A * | 5/2000 | Cornelia et al. ............ 715/531 |
| 6,094,647 A * | 7/2000 | Kato et al. ...................... 707/2 |
| 6,237,011 B1 * | 5/2001 | Ferguson et al. ........... 715/515 |
| 6,718,333 B1 * | 4/2004 | Matsuda ..................... 707/102 |
| 2002/0042789 A1 * | 4/2002 | Michalewicz et al. ......... 707/3 |
| 2002/0091671 A1 * | 7/2002 | Prokoph ........................ 707/1 |
| 2003/0142128 A1 | 7/2003 | Reulein et al. |
| 2003/0144982 A1 | 7/2003 | Reulein et al. |
| 2004/0205656 A1 | 10/2004 | Reulein et al. |

* cited by examiner

*Primary Examiner*—Jeffrey Gaffin
*Assistant Examiner*—Hassan Tony Mahmoudi
(74) *Attorney, Agent, or Firm*—Law Office of Charles W. Peterson, Jr.; Louis J. Percello, Esq.; Satheesh K. Karra, Esq.

(57) ABSTRACT

A document search and retrieval system and program product therefor. Search requests are provided to the system through a user interface. A document decomposer decomposes documents into individual document components. Document components and corresponding searchable indices for each are stored in a Component Library. A search unit searches stored document components responsive to search queries. A results validator compares document hitlists with a document type identified in a search query to select valid hitlists entries for a final hitlist. A document view assembly module collects identified document components and assembles them into a document for view at the user interface.

18 Claims, 7 Drawing Sheets

SYSTEM AND METHOD FOR GENERATING AND RETRIEVING DIFFERENT DOCUMENT LAYOUTS FROM A GIVEN CONTENT

BACKGROUND OF THE INVENTION

1. Field of the Invention

The present invention is related to searching and retrieving electronic documents over a computer network and more specifically, to dynamically assembling electronic documents at retrieval, based on the document type most suitable for the user context.

2. Background Description

Normally, someone wishing to find information over the Internet uses a search engine to identify and retrieve relevant documents. Documents available over the Internet normally have a fixed document type (e.g. Download, Hints & Tips, White Paper, etc.) with static content layout. Specialized search engines may filter search results based on document type, filtering out all documents not matching the specified document type or types.

Figure 1:
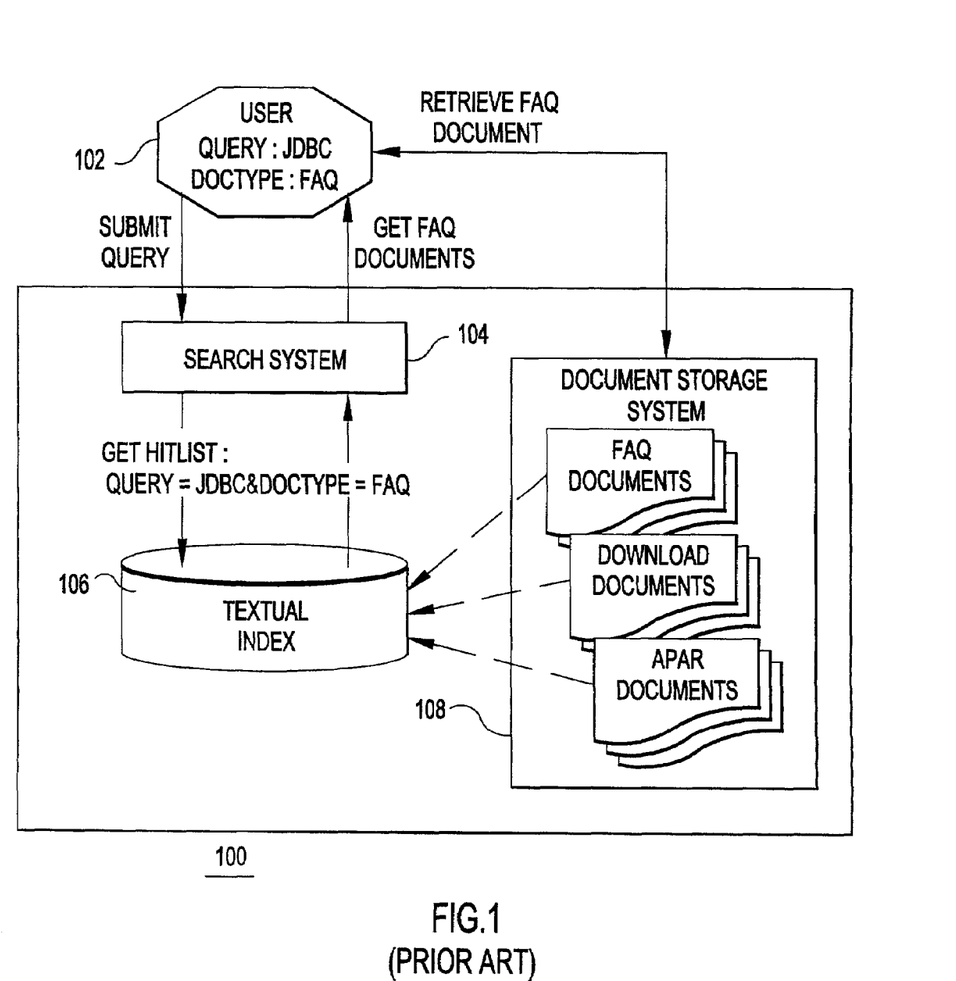
FIG. 1 shows a block diagram of a prior art document retrieval system.

FIG. 1 illustrates a traditional document search and retrieval system 100 or search engine that may be used for such searches. In response to each search query, the search engine 100 returns documents of one preferred type only without returning other possibly more relevant documents. The system 100 includes a user interface 102, a search unit 104, a textual index 106 and a document storage system 108. The document storage system 108 contains different types of static documents, e.g., Frequently Asked Questions (FAQ), Downloads and Authorized Program Analysis Reports (APAR). The textual index 106 contains a searchable index for documents in document storage system 108. Each search query includes both search terms and preferred document type that are entered at user interface 102 and passed to search unit 104. Search unit 104 searches textual index 106 to identify a hitlist, e.g., of FAQ documents, that contain specified search terms. Search unit 104 returns the document hitlist through user interface 102. So, for example, listed FAQs are selected from document storage system 108 for viewing through user interface 102. Two such examples of technical support search engines that include document type with a search query are support sites from Microsoft Corporation (support.microsoft.com/default.aspx?scid=fh;EN-US;sq1), where topic category must specify document type; and, from IBM Corporation (www-1.ibm.com/support/manager.wss?rs=0&rt=2), where the user directly specifies document type.

Unfortunately, very often this typical system 100 may not provide an answer/solution to the query, especially, when the correct answer is embedded in a document that does not match the requested document type/layout. In another example, to find downloadable video driver for product A, a prior art system may limit the search scope to 'Download' documents only. So, the search engine may overlook relevant information that appears in a Hints&Tips document instead for example. So, the search result is somewhat limited by a document layout or type that is normally once and forever determined by the document provider. Typically, unless the same document is stored in multiple formats, the searcher cannot choose content layout. So, typical state of the art search engines are restricted by the static nature of available documents. Thus, navigating through document storage to find relevant information often requires a level of familiarity with the document type schema. Document organization may hamper searching. Different content providers cannot choose suitable content and layout for particular local portals. So, users must live with whatever documents are stored and available.

These search constraints are especially troublesome in corporate technical support systems, typically a complex hierarchical schema of document types combined with a product taxonomy tree. Usually corporate-wide documents are standardized to provide a unified document view through the corporate technical support portal. These constraints make retrieving information from a corporate technical support system a challenging task especially if the document storage system contains heterogenous document collections.

Thus, there is a need for a way to select document presentation according to the needs of a particular user or presentation context.

SUMMARY OF THE INVENTION

It is a purpose of the invention to facilitate finding relevant information regardless of the format of documents containing the information;

It is another purpose of the invention to present such information in a selectable document type and/or layout that may not match the format of the original document containing the information;

It is yet another purpose of the invention to choose a most suitable document content layout.

The present invention is a document search and retrieval system and program product therefor. Search requests are provided to the system through a user interface. A document decomposer decomposes documents into individual document components. Document components and corresponding searchable indices for each are stored in a Component Library. A search unit searches stored document components responsive to search queries. A results validator compares document hitlists with a document type identified in a search query to select valid hitlists entries for a final hitlist. A document view assembly module collects identified document components and assembles them into a document for view at the user interface.

BRIEF DESCRIPTION OF THE DRAWINGS

The foregoing and other objects, aspects, and advantages will be better understood from the following non limiting detailed description of preferred embodiments of the invention with reference to the drawings that include the following.

DETAILED DESCRIPTION OF PREFERRED EMBODIMENTS

According to a preferred embodiment of the present invention, content components are extracted from original documents and stored in a component library. When a query calls for information found in the content components, a context is selected in which retrieved information is viewed. Documents of the chosen type/layout are constituted on the fly from stored document components. More relevant documents may be identified and rendered in a selected context/layout.

Figure 2:
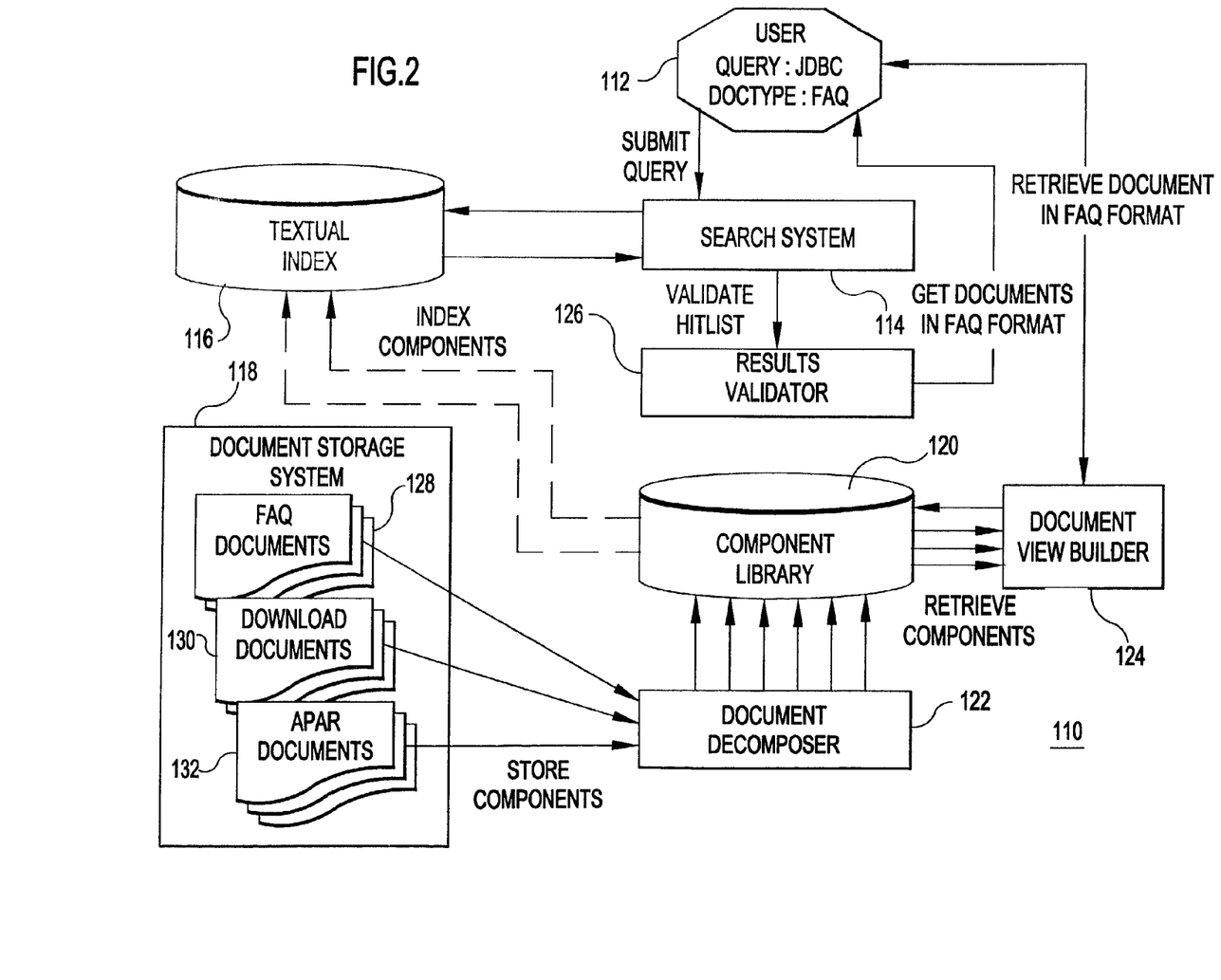
FIG. 2 shows a block diagram of an example of a preferred embodiment of the present invention.

FIG. 2 shows an example of a component based document search and retrieval system 110 according to a preferred embodiment of the invention. The system 110 includes an User Interface 112, a Search Unit 114, a Textual Index 116, Document Storage 118, a Component Library 120, a Document Decomposer 122, a Document View Builder 124 and a Result Validator 126. The Document Storage 118 contains different types of documents, e.g., FAQs 128, Downloads 130 and APARs 132.

The Document Decomposer 122 distills individual components from each of the documents 128, 130, 130 and the components are stored in the Component Library 120. For example, a typical FAQ 128 might include a Title, a Problem Statement, a Solution and, optionally a reference link to additional information. Further, these document components can be collected and assembled to form an FAQ document. Likewise, a Download document may include a Title, a Solution, an Attachment and a reference. Table 1 is an example illustrating typical document components for several document types. Typically, each of these components is tagged by a section subtitle in the original document. Each document type has its own set of sections according to predefined corporate templates. The Document Decomposer 122 locates each tagged component, extracts each located component and stores extracted components in the Component Library 120. Then, the individual components are indexed in the Textual Index Unit 116, making each indexed component available for full text search.

TABLE 1

| Doc.Type | Title | Abstract | Problem | Solution | Attachment | Reference |
|---|---|---|---|---|---|---|
| FAQ | X | | X | X | | X |
| APAR | X | X | X | X | | X |
| Hints & Tips | X | X | | X | | |
| Download | X | | | X | X | X |

A search is initiated with a query that specifies both search terms and preferred document type passing through the User Interface 112 to Search Unit 114. Search Unit 114 searches component indices in Textual Index 116 and retrieves a hitlist for specified search terms. Results Validator 126 checks the hitlist and identifies candidates that include all of the components needed to constitute a document in the selected format, e.g., FAQ format. The Results Validator 126 returns a list of remaining documents that can be constituted into the selected format. Each request also passes through User Interface 112 to Document View Assembly Module 124 which retrieves and assembles components into a document in the selected format. The assembled document is returned for viewing through User Interface 112.

Figure 3:
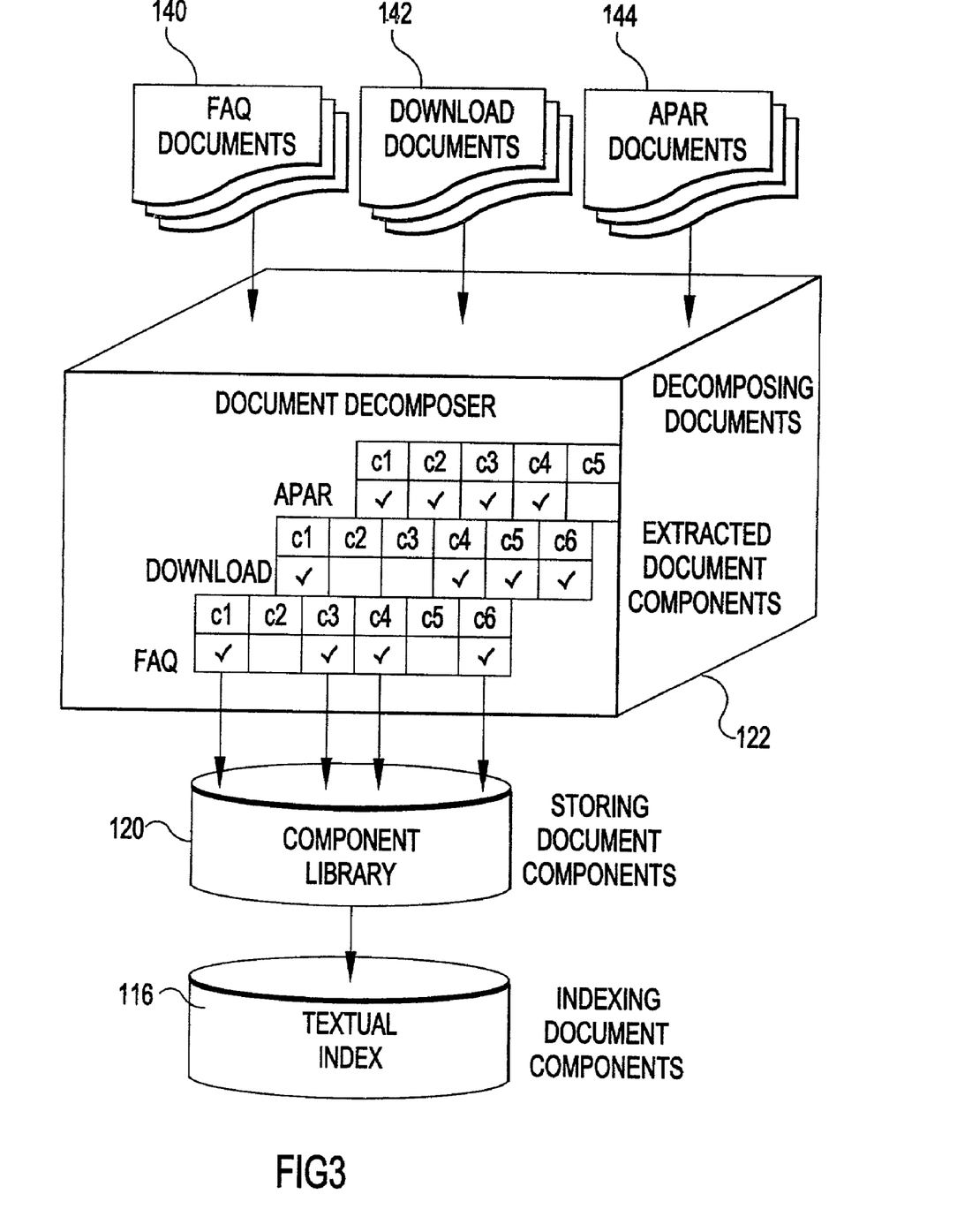
FIG. 3 shows an example of document decomposition and indexing schema according to a preferred embodiment wherein a Document Decomposer module extracts document components and stores them in the Component Library.

FIG. 3 illustrates document decomposition and indexing document collections 140, 142, 144 by Document Decomposer 122. Different types of documents pass from collections 140, 142, 144 to Document Decomposer 122. The Document Decomposer 118 locates and extracts document components/elements, according to the original document type model (e.g., Table 1). Extracted document components are stored in Component Library 120. Then, the content of each of the document components is indexed in the Textual Index 122 for full text search.

Figure 4:
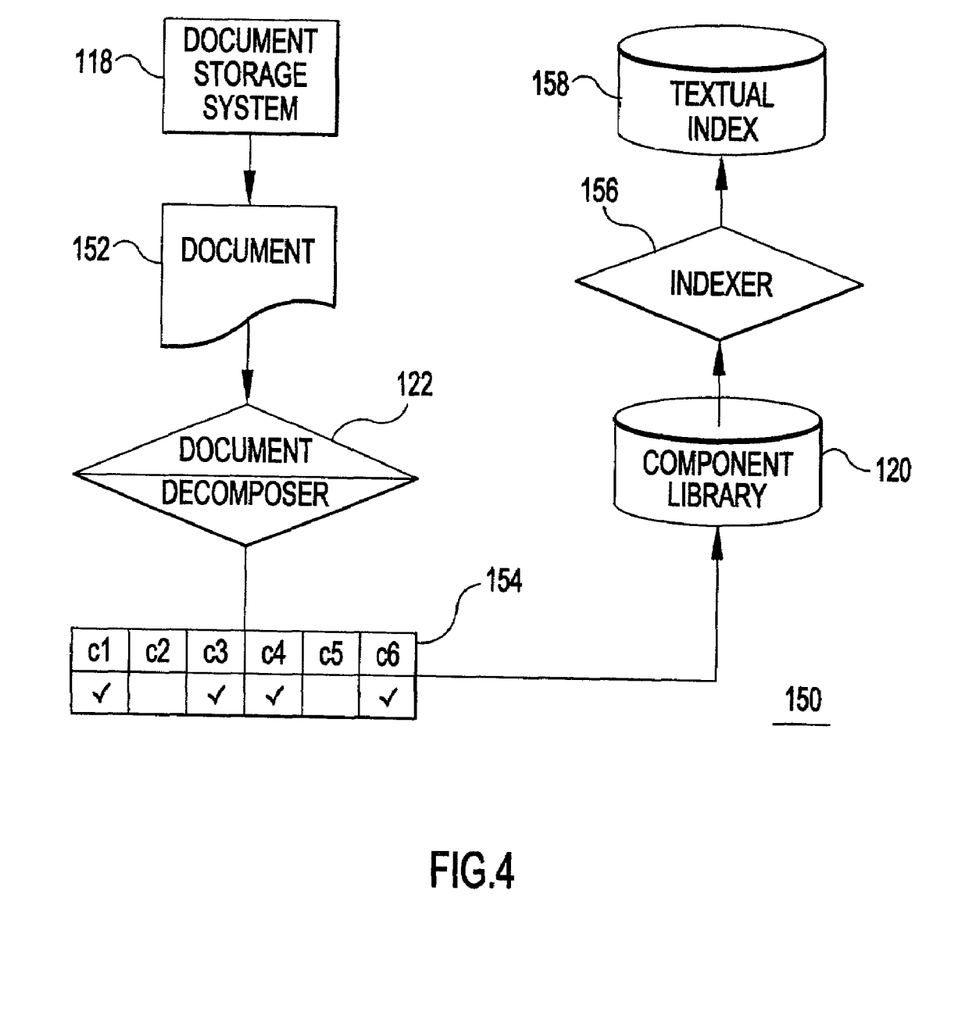
FIG. 4 shows an example of a document decomposition and indexing flow chart showing how the Document Decomposer module interacts with other modules.

FIG. 4 shows an example of a document decomposition and indexing flow chart 150. The Document Storage System 116 passes a document 152 to Document Decomposer 122. The Document Decomposer 122 extracts document components 154 and passes the extracted components to Component Library 120. Document components are passed from Component Library 120 to Indexer 156 which creates an inverted Textual Index 158 of all words in each document component to enable full text search. The Indexer 156 associates the entries in this Textual Index 158 with documents that contain the components.

In addition to document components, the Component Library 120 contains a table of document type masks for every supported document type. Table 2 shows an example of a document type mask table for the above example of four identified document types. Each document type mask defines a set of components constituting a particular document type.

TABLE 2

| Doc.Type | Title | Abstract | Problem | Solution | Attachment | Reference |
|---|---|---|---|---|---|---|
| FAQ | 1 | 0 | 1 | 1 | 0 | 1 |
| APAR | 1 | 1 | 1 | 1 | 0 | 1 |
| Hints & Tips | 1 | 1 | 0 | 1 | 0 | 0 |
| Download | 1 | 0 | 0 | 1 | 1 | 1 |

In another preferred embodiment of the present invention, a document search is constrained such that the search result hitlist includes only documents that can be rendered in the requested viewing context. So, for example, while search results may identify numerous documents in each of the document types, the search results hitlist would list only those documents that can be constitute a FAQ type layout, i.e., FAQ and APAR type documents.

Figure 5:
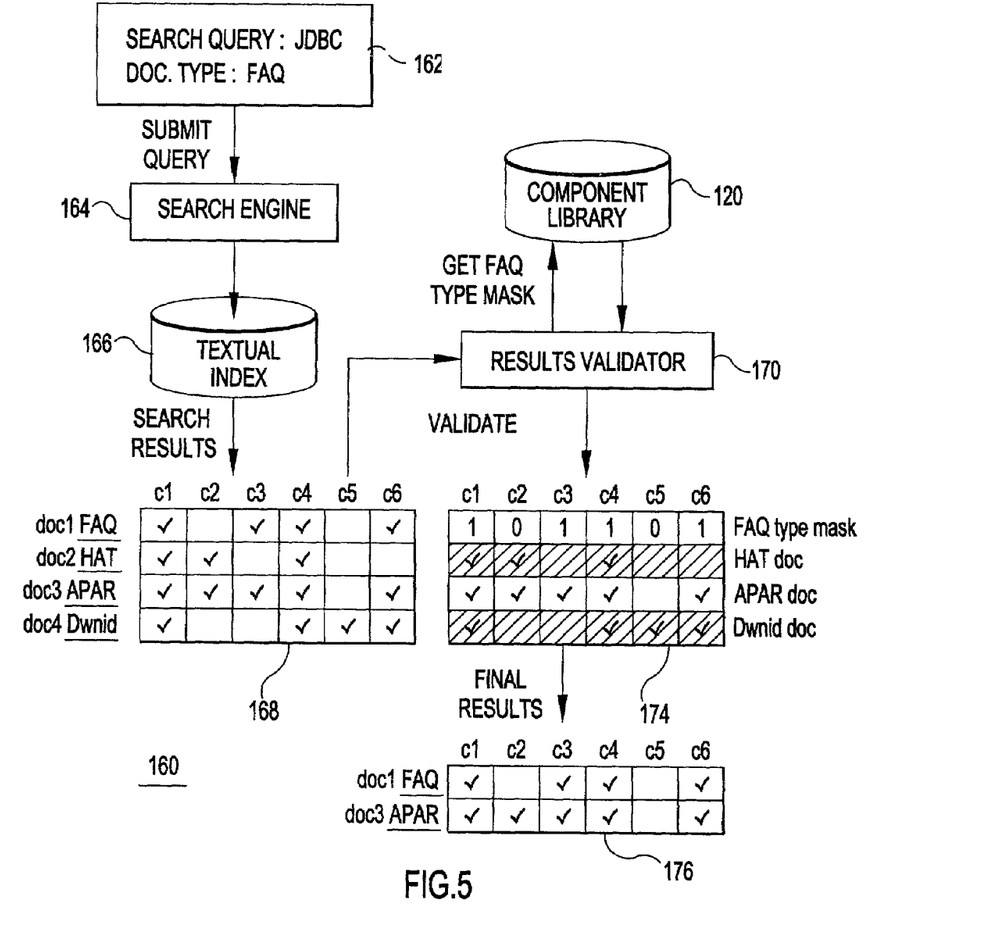
FIG. 5 shows an example of a preferred embodiment document search schema, wherein different type documents are returned by the Search Engine for selection and viewing.

FIG. 5 shows an example of this second preferred embodiment document search schema 160. A Search Query 162 that specifies both query terms and a selected document type is submitted to Search Engine 164. The Search Engine 164 uses the Textual Index 166 to find stored document components that contain the specified query terms. A hitlist of document hits of appropriate document types is extracted from Textual Index 166 as Search Results 168. The Search Results 168 hitlist is passed to the Results Validator 170 which uses an appropriate document type mask to perform document selection, selecting documents that can be rendered in the selected context. The Results Validator 170 uses a requested document type mask from the Component Library 120 to filter documents (exclude) from the hitlist that could not be configured to match the requested document type. Results Validation Table 174 is an example of results validation output from Results Validator 170. The Final Results 176 hitlist is a reduced hitlist that includes only documents with at least matching components necessary for requested document type.

Figure 6:
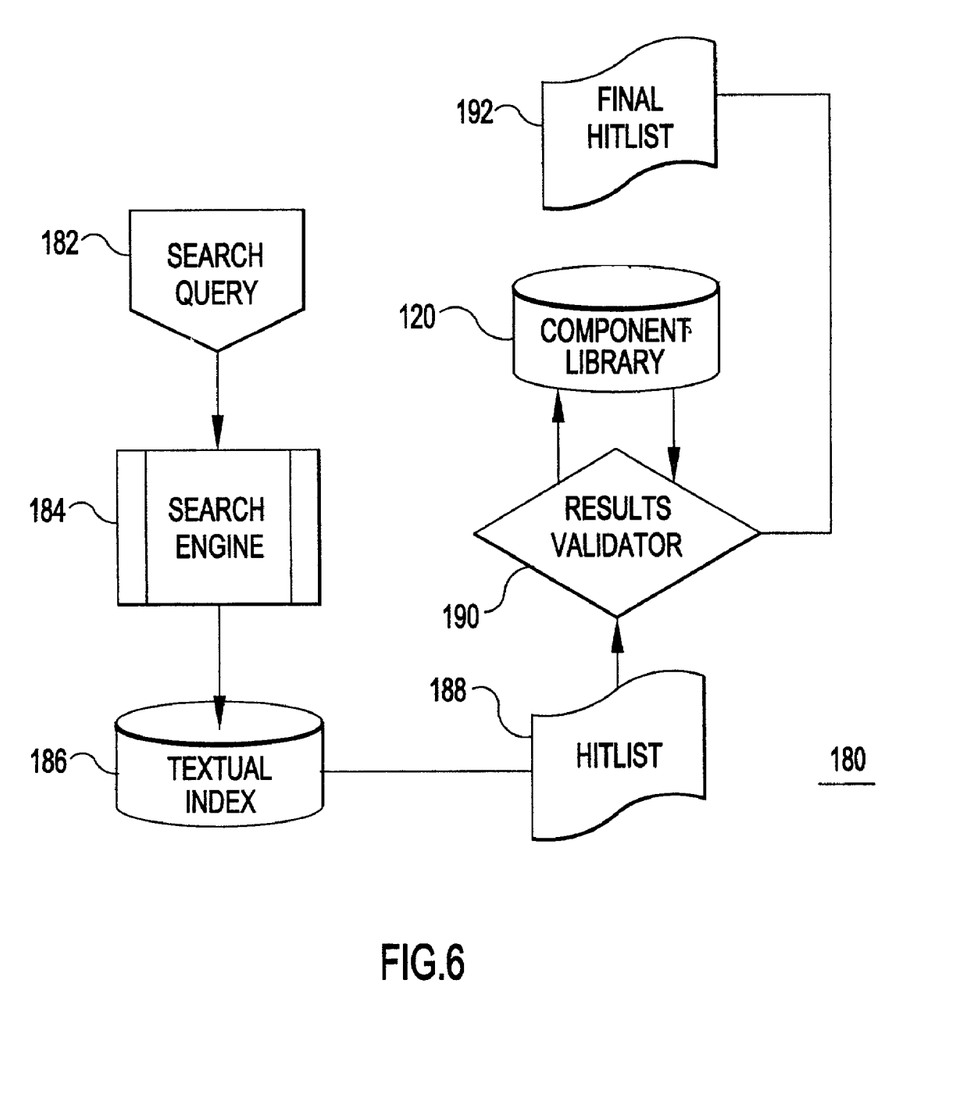
FIG. 6 shows an example of a preferred document search flow chart of how the Results Validator module interacts with other modules of the present invention.

FIG. 6 shows a flow chart of a document search 180 using the document schema 160 of FIG. 5. A user submits a search query 182 to Search Engine 184 initiating the search. The Search Engine 184 uses the Textual Index 186 to produce a hitlist 188 of documents with components that match query terms. The Results Validator 190 checks document hits in the hitlist 188 against the requested document type mask from Component Library 120. Only documents with at least components in the document type mask are output in a Final Hitlist 192.

Figure 7:
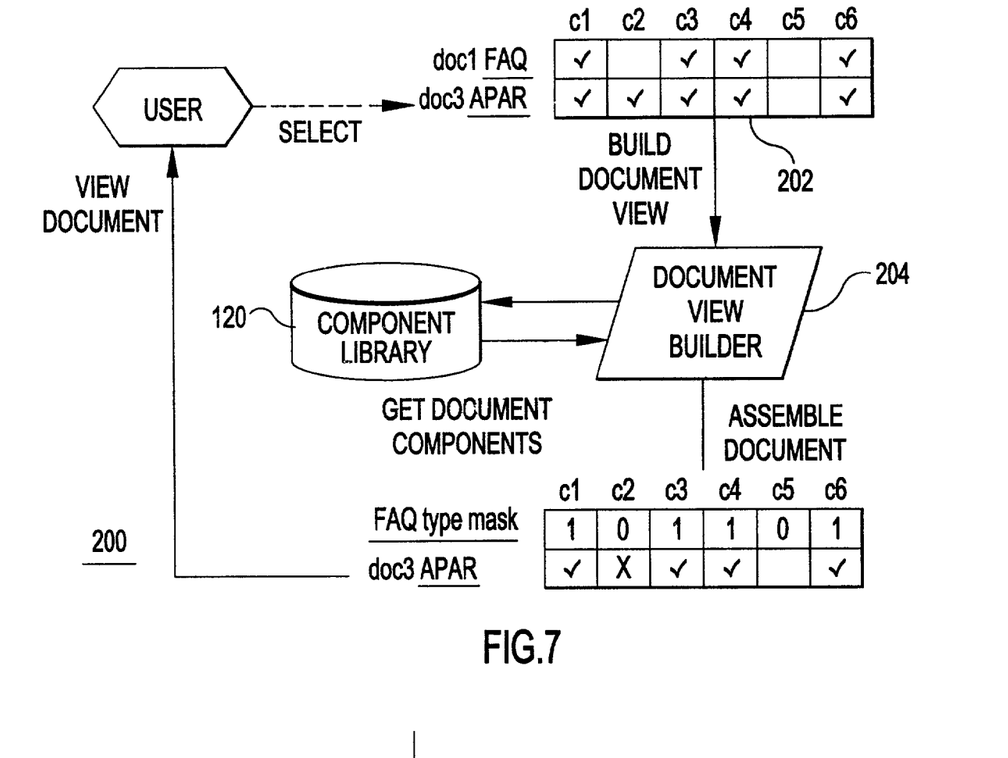
FIG. 7 is an example of a document viewing schema, wherein the Document View Builder module retrieves document components from the Component Library module and assemble a document for view according to the selected context.

FIG. 7 shows an example of a preferred document viewing schema 200. Once the search is completed, (i.e., in 176 and 192 of FIGS. 5 and 6), the user may select one of the listed documents to view the document content. The request is passed to a Document Retrieval Module 200 that retrieves requested document components from the Component Library 120. One of the hits (e.g., an APAR document) in the Hitlist 202 is selected for viewing. The Document View Builder 204, retrieves requested components from Component Library 120 and assembles the document components according to the requested document mask (FAQ mask) by applying the layout defined by the requested document type.

Figure 8:
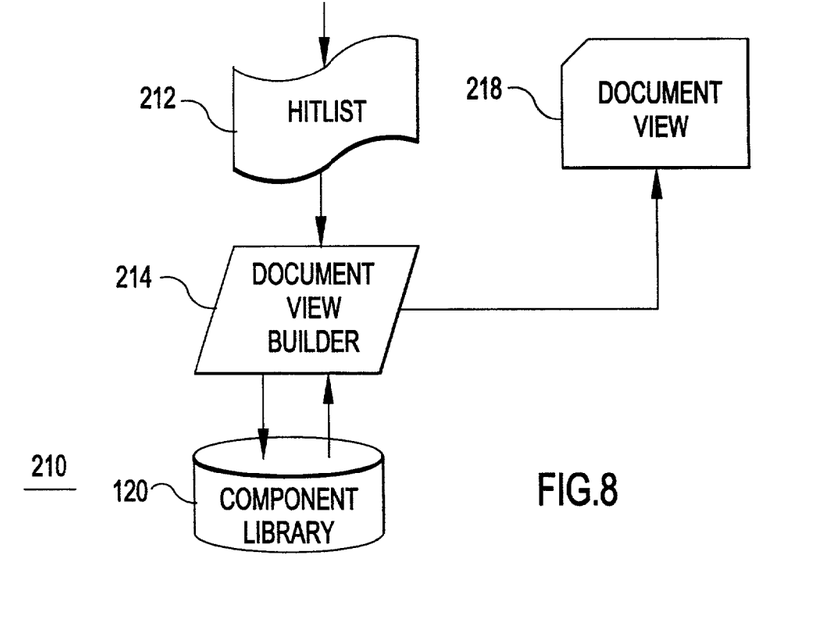
FIG. 8 shows an example of a preferred document viewing flow chart of how the Document View Builder interacts with other modules of the present invention.

FIG. 8 shows an example of a document view construction flow chart 210. The Document View Builder 218 assembles the document by including and omitting relevant components to match the requested document type. After selecting an entry from final hitlist 212, the Document View Builder 214 retrieves components for the selected entry from the Component Library 216. Then, the Document View Builder 214 assembles the components into a viewable document according to the selected format and outputs the assembled document over the user interface for viewing 218.

Thus, search result documents are provided in a user selected document type based upon the user request. Documents of a requested type are assembled dynamically from a given content. The document with an answer/solution for the user's question/problem can be found, even if its static document type does not match the document type requested by the user. Advantageously, the number of available document types for a given content is supplemented from previously unavailable documents.

While the invention has been described in terms of preferred embodiments, those skilled in the art will recognize that the invention can be practiced with modification within the spirit and scope of the appended claims.

We claim:

1. A system for searching document components and retrieving search result documents, said system comprising:
    a document decomposer decomposing documents into individual document components;
    a component library storing said document components and containing a table of document type masks corresponding to supported document types, each document type mask defining a set of components constituting a particular document type;
    a search unit searching stored said document components responsive to search queries; and
    a results validator analyzing document hitlists of documents identified by said search unit against a document type identified in a search query to select valid hitlists entries for a final hitlist, entering selected hitlist entries into said final hitlist.

2. A system as in claim 1 wherein search requests are provided as said search queries including search terms and a preferred document type to said system through a user interface and search results are provided from said system through said user interface.

3. A system as in claim 1 wherein the document decomposer locates document components within an identified document, extracts each located component and stores extracted components in said component library.

4. A system as in claim 3 wherein said results validator identifies documents
    in said hitlist containing components constituting a selected document type.

5. A document search and retrieval system as in claim 4 wherein said document decomposer decomposes documents of document types including frequently asked questions (FAQ), downloads and authorized program analysis reports (APAR).

6. A system as in claim 1 further comprising:
    a textual index unit containing a searchable index of said components stored in said component library.

7. A system as in claim 6 wherein said textual index unit includes an indexer indexing components in said component library to create a textual index for each component.

8. A system as in claim 1, further comprising:
    a document view assembly module collecting identified said document components and assembling collected said document components into a document for view at a user interface.

9. A document component search system operating on one or more computer systems, the computer systems having one or more central processing units (CPUs), one or more memories, and one or more network interfaces connecting the computer system to one or more computer networks, said document search system comprising:
    a document decomposer extracting text subportions from documents to distill document components, said documents being defined by one or more document type models, document components being indexed for full text searching;
    a document search unit identifying relevant documents of static document type and validating search results, said document search unit comparing each respective document type model to the requested document type mask and selecting one or more documents for viewing as a requested document type, valid search results being documents that include all components of said requested document type; and
    a document retrieval unit collecting components for a selected document type from a selected valid document and dynamically assembling said document components according to said selected document type for display ,wherein a resulting document is displayed in the selected format type.

10. A document component search system as in claim 9, said document decomposer comprising:
    identification means for identifying document components according to document type;
    storage means for storing documents for decomposition and storing document components in a component library; and
    text indexing means for indexing document component content for text searching.

11. A document component search system as in claim 9 wherein the document retrieval unit comprises a document view construction unit dynamically assembling documents from document components according to said requested document type model, said document view construction unit comprising:
   a component selection unit selectively retrieving said document components matching a document type mask; and
   a document assembler assembling retrieval components into a viewable document according to said requested document type mask.

12. A computer program product for searching and retrieving document components and presenting documents constituted from retrieved components for view, said computer program product comprising a computer usable medium having computer readable program code thereon, said computer readable program code comprising:
   computer readable program code means for entering search requests and presenting search results for view;
   computer readable program code means for decomposing documents into individual document components;
   computer readable program code means for storing said document components in a component library;
   computer readable program code means for storing a searchable index of said document components stored in said component library, wherein said computer readable program code means for storing document components stores a table of document type masks corresponding to supported document types including frequently asked questions (FAQ), downloads and authorized program analysis reports (APAR), each document type mask defining a set of components constituting a particular document type,
   computer readable program code means for searching stored document components responsive to a search query and listing documents identified as responding to said search query in a hitlist; and
   computer readable program code means for analyzing document hitlists against a document type identified in said search query to select valid hitlists entries for a final hitlist, entering selected hitlist entries into said final hitlist.

13. A computer program product as in claim 12, wherein decomposable document types include frequently asked questions (FAQ), downloads and authorized program analysis reports (APAR).

14. A computer program product as in claim 12, wherein the computer readable program code means for entering search requests accepts queries including search terms and a preferred said document type.

15. A computer program product as in claim 12, wherein said computer readable program code means for decomposing documents locates document components within an identified document, extracts each located component and stores extracted components in said component library.

16. A computer program product as in claim 12, wherein said computer readable program code means for storing a searchable index includes computer readable program code means for indexing components in said component library to create a textual index for each stored said document component, said textual index being stored as a searchable index.

17. A computer program product as in claim 12, wherein said computer readable program code means for analyzing document hitlists identifies documents in said hitlist containing components constituting a selected document type.

18. A computer program product as in claim 12, further comprising: computer readable program code means for collecting identified said document components and assembling collected said document components into a document for view.

* * * * *